United States Patent
Kleist et al.

(10) Patent No.: US 7,181,346 B1
(45) Date of Patent: Feb. 20, 2007

(54) SYSTEM AND METHOD FOR ASSESSING THE PEOPLE AND PROPERTY IMPACT OF WEATHER

(75) Inventors: Michael R. Kleist, Nashua, NH (US); Douglas G. Dempster, Andover, MA (US)

(73) Assignee: WSI Corporation, Andover, MA (US)

( * ) Notice: Subject to any disclaimer, the term of this patent is extended or adjusted under 35 U.S.C. 154(b) by 78 days.

(21) Appl. No.: 11/095,345

(22) Filed: Mar. 31, 2005

(51) Int. Cl.
*G01W 1/00* (2006.01)
*G06Q 50/00* (2006.01)

(52) U.S. Cl. .................................... 702/3; 702/5
(58) Field of Classification Search ........ 702/3, 702/4, 5; 342/26 R, 26 A–26 D; 705/6, 705/7; 703/6, 9
See application file for complete search history.

(56) References Cited

U.S. PATENT DOCUMENTS

| | | | |
|---|---|---|---|
| 5,724,255 A * | 3/1998 | Smith et al. ............... 700/266 |
| 5,807,113 A * | 9/1998 | Groeber ...................... 434/218 |
| 6,084,510 A * | 7/2000 | Lemelson et al. ..... 340/539.13 |
| 6,188,960 B1 * | 2/2001 | Baron et al. ................... 702/3 |
| 6,240,369 B1 * | 5/2001 | Foust ............................ 702/3 |
| 6,278,947 B1 * | 8/2001 | Baron et al. ................... 702/3 |
| 6,289,277 B1 * | 9/2001 | Feyereisen et al. ......... 701/202 |
| 6,339,747 B1 * | 1/2002 | Daly et al. ..................... 702/3 |
| 6,360,172 B1 * | 3/2002 | Burfeind et al. ............... 702/2 |
| 6,405,134 B1 * | 6/2002 | Smith et al. ................... 702/4 |
| 6,493,633 B2 * | 12/2002 | Baron et al. ................... 702/3 |
| 6,501,392 B2 * | 12/2002 | Gremmert et al. .......... 340/971 |
| 6,577,947 B1 * | 6/2003 | Kronfeld et al. ............ 701/202 |
| 6,603,405 B2 * | 8/2003 | Smith ......................... 340/905 |
| 6,606,553 B2 * | 8/2003 | Zobell et al. ............... 701/120 |
| 6,646,559 B2 * | 11/2003 | Smith ......................... 340/601 |
| 6,650,972 B1 * | 11/2003 | Robinson et al. ............... 701/3 |
| 6,654,689 B1 * | 11/2003 | Kelly et al. .................... 702/3 |
| 6,744,382 B1 * | 6/2004 | Lapis et al. ................. 340/971 |
| 6,753,784 B1 * | 6/2004 | Sznaider et al. ............ 340/601 |
| 6,816,878 B1 * | 11/2004 | Zimmers et al. ............ 709/200 |
| 6,823,263 B1 * | 11/2004 | Kelly et al. .................... 702/3 |
| 6,829,536 B2 * | 12/2004 | Moore ........................... 702/3 |
| 6,842,737 B1 * | 1/2005 | Stiles et al. .................... 705/6 |
| 6,845,324 B2 * | 1/2005 | Smith ............................ 702/3 |
| 2001/0052847 A1 * | 12/2001 | Auerbach ................... 340/540 |
| 2002/0016677 A1 * | 2/2002 | Baron et al. ................... 702/3 |
| 2003/0004780 A1 * | 1/2003 | Smith et al. ................. 705/10 |

(Continued)

OTHER PUBLICATIONS

Bashein, et al., "Centroid of a Polygon", "Graphics Gems IV", Paul Heckbert (Editor), Academic Press 1994, 3-6.

(Continued)

*Primary Examiner*—Donald McElheny, Jr.
(74) *Attorney, Agent, or Firm*—Woodcock Washburn LLP

(57) ABSTRACT

A system and method for determining information about the potential impact of a significant weather event on a category of interest, such as a population base, property, traffic flow and infrastructure. Information about the forecasted path of a weather event is used in conjunction with census or other data to determine the human safety and property risks, etc. that are present in the situation. The path of the weather event is used to determine an area which is likely to be effected by the storm during the time period. The population, property value, traffic flow, infrastructure etc. within the area is determined to ascertain the impact of the weather event.

16 Claims, 4 Drawing Sheets

U.S. PATENT DOCUMENTS

| | | |
|---|---|---|
| 2003/0025627 A1* | 2/2003 | Wilson et al. ............... 342/26 |
| 2004/0015336 A1* | 1/2004 | Kulesz et al. ............... 703/11 |
| 2004/0073482 A1* | 4/2004 | Wiggins et al. ............. 705/14 |
| 2004/0133530 A1* | 7/2004 | Smith et al. ................. 706/2 |
| 2005/0086004 A1* | 4/2005 | Smith ........................... 702/3 |
| 2005/0197775 A1* | 9/2005 | Smith ........................... 702/3 |
| 2005/0240378 A1* | 10/2005 | Smith et al. ............... 702/188 |

OTHER PUBLICATIONS

Snyder, J.P., Map Projections—A Working Manual, *US Geological Survey Professional Paper 1395*, 1987, 1-7.

Weiler, K. et al., "Hidden Surface Removal using Polygon Area Sorting", *ACM SIGGRAPH Computer Graphics*, 1977, 11(2), 214-222.

* cited by examiner

SYSTEM AND METHOD FOR ASSESSING THE PEOPLE AND PROPERTY IMPACT OF WEATHER

FIELD OF THE INVENTION

The present invention relates to weather forecasting. In particular, the present invention is directed to a system and method of utilizing weather forecasts to provide an indication of the impact of a weather event on a particular category of interest, such as a population base or property.

BACKGROUND OF THE INVENTION

The impact of weather forecast information on people and property can be substantial. For example, many different types of weather conditions may cause power outages and property damage ranging from sporadic to widespread. Storm events may leave hundreds of thousands of customers without power and the damage to property reaching the millions of dollars.

It is common in broadcast and cable weather presentations to indicate the forecasted track of significant weather events or phenomena. For example, a sector (or other geometric area) typically indicates where a thunderstorm is likely to go in the ensuing 10 to 30 minutes and often depicts the future movement of that storm. Similarly, a hurricane track often depicts the forecasted movement of a hurricane over the coming 2 or 3 days. In each such case, however, the potential impact to safety and property is not presented. This information would be useful to the general public as it conveys the significance of a weather event. This information is also useful to insurance companies, emergency response teams, etc., as it may be used to prioritize response activities.

Thus, there is a need for improvements in weather forecasting that will provide additional information regarding the impact of a storm or other weather event. The present invention provides for such a system.

SUMMARY OF THE INVENTION

The present invention is directed to systems and methods for determining the affect of a weather event on a category of interest, such as a population base or property within a geographic area. In accordance with an aspect of the invention, a method is provided that includes obtaining weather data; obtaining data regarding the category of interest, the data being segmented into geographic regions; determining a weather-affected geographical region within a path of the weather event; determining intersections of the weather-affected geographic region and the predetermined geographic regions; and determining a quantity affected by the weather event in accordance with the intersections, the quantity being related to the category of interest.

The weather-affected geographical region may described as a polygon and the method may also include determining vertices of the polygon and geographic areas as latitude, longitude pairs. An area of the intersections of the weather-affected geographic region and the geographic regions may be determined to ascertain the quantity affected by the weather event. In particular, a total of the category of interest (e.g., people or property value) for a predetermined geographic region may be multiplied by a ratio of each intersecting area and a predetermined geographic region to obtain a sub-quantity for each the area and then summing all sub-quantities to determine the quantity.

In addition, the method may further include selecting a map projection that includes the weather-affected geographic region and generating a map of the weather-affected geographic region showing the path of the weather event.

According to another aspect of the invention, there is provided a system for determining the affect of a weather event on a category of interest. The system includes a database that receives weather data and data regarding the category of interest, the data being segmented into geographic regions, a processor for forecasting weather conditions and determining a weather-affected geographic region based on the weather conditions, and a visualization system for outputting a visualization of forecasted weather conditions. Intersections of the weather-affected geographic region and the predetermined geographic regions may be determined to ascertain a quantity related to the category of interest affected by the weather event.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings.

DETAILED DESCRIPTION OF ILLUSTRATIVE EMBODIMENTS

Information about the potential impact of a significant weather event on a category of interest such as safety and property is important to determine which weather events are the most important to convey and to properly inform viewers about the severity of the weather event. The present invention uses the information about the forecasted path of a significant weather event in conjunction with census or other data about the location of people and property, and any available information about the typical impact of the particular weather event on people and property to determine the human safety and property risks that are present in the situation. It is noted that the present invention may be used to determine the impact of a weather event on categories of interest other than population or property.

Figure 1:
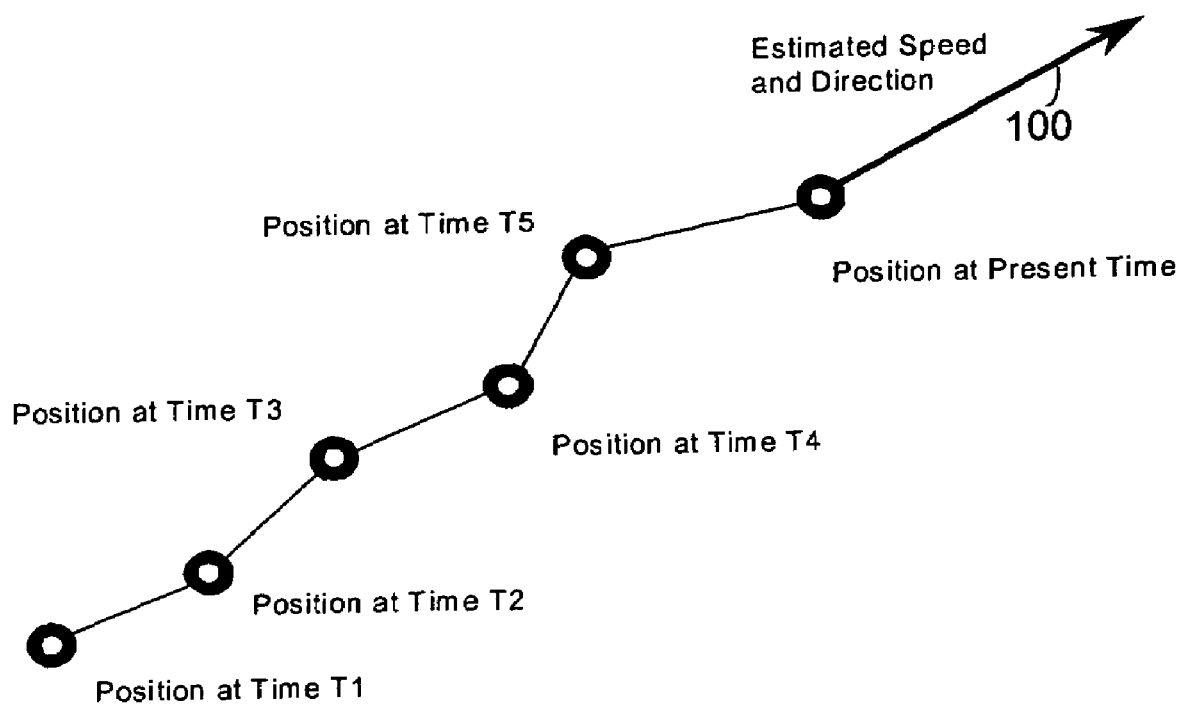
FIG. 1 illustrates an exemplary storm path showing speed and direction at selected times.

In the preferred embodiment, a severe thunderstorm is identified by examining the reflectivity (rainfall rate) and radial velocity (wind speed and direction relative to the radar site) data from a weather radar volume scan. The severe thunderstorm is tracked by locating it in successive volume scans. As shown in FIG. 1, the position of the thunderstorm is used in each volume scan and the time of each volume scan to estimate the speed and direction 100 of the path of the thunderstorm for the ensuing 10 to 30 minutes.

Figure 2:
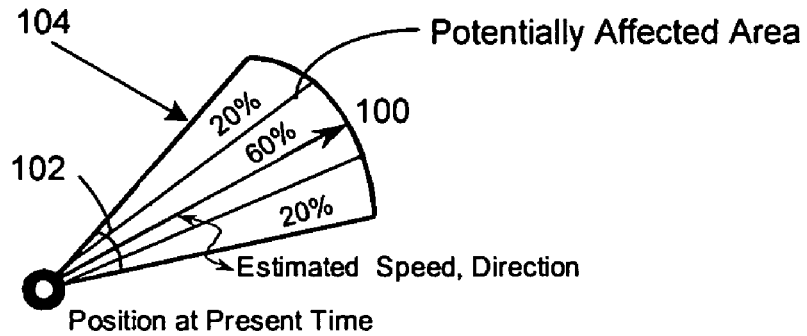
FIG. 2 illustrates a projected area that will be affected by storm path of FIG. 1.

As shown in FIG. 2, the estimated speed and direction 100 are used in conjunction with a time period and a variability angle 102 to form a sector 104 that represents the area which is likely to be effected by the storm during the time period. The sector may be further divided into probabilistic regions that define the likely path of the severe weather. The probabilities may be used as part of a calculation to determine the affect of the storm on people, property, traffic, infrastructure, etc.

Figure 3:
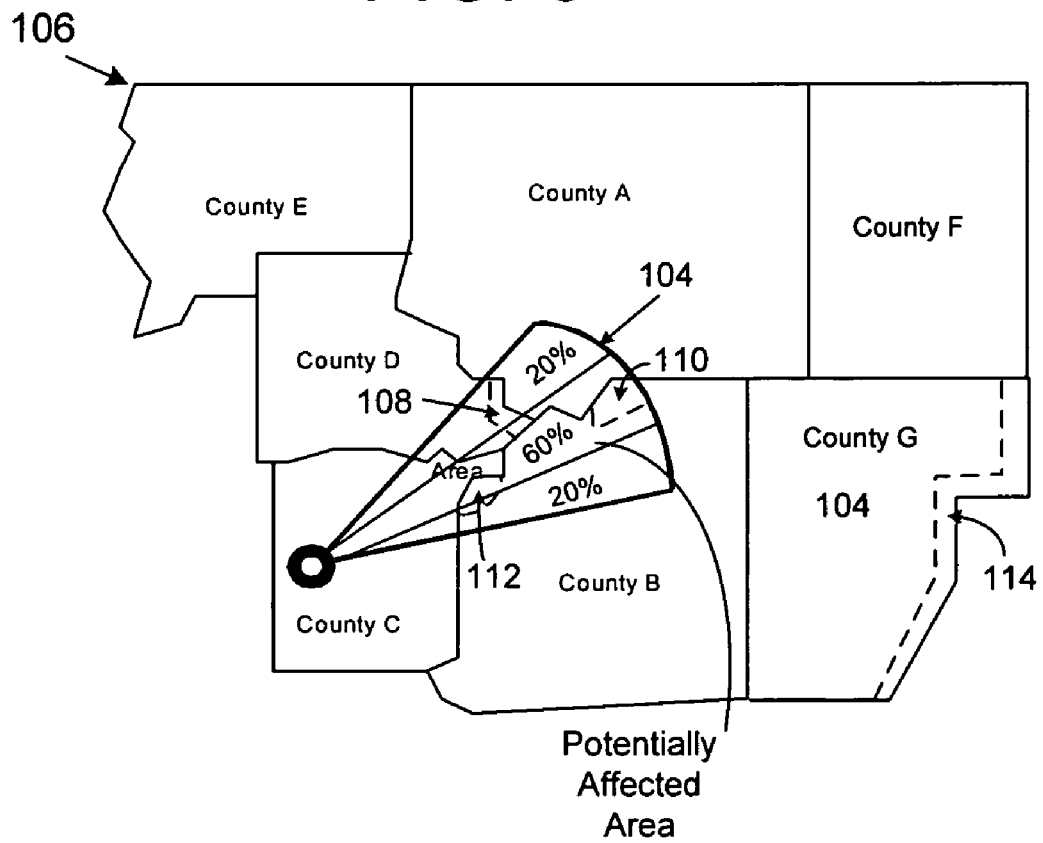
FIG. 3 illustrates the projected area of FIG. 2, mapped to a geographic area that will be affected by the storm.

As shown in FIG. 3, the sector 104 may be overlaid a map of a geographic area 106. The population or property value within the sector 104 may be interpolated from data maintained by the United States Census Bureau or other source. The United States Census Bureau maintains information regarding population base, property values, etc., by county, zip code or similar geographic division. Other sources of data for other information (e.g., traffic and infrastructure) may be consulted, as necessary.

Each county (or other subdivision) may be further subdivided into smaller sections 108, 110, 112 and 114, if such data is available. This may be useful, if for example, a particular region has a higher density of people, infrastructure, property, etc. that may be affected by the severe weather. For example, if County G borders the ocean, it is like that property values in the section 114 may be much higher than the remaining portion of the county. Likewise, if section 112 contains a high density of high-rise apartment buildings, the population in that section 112 may be significantly higher than the remaining portion of County B.

Figure 4:
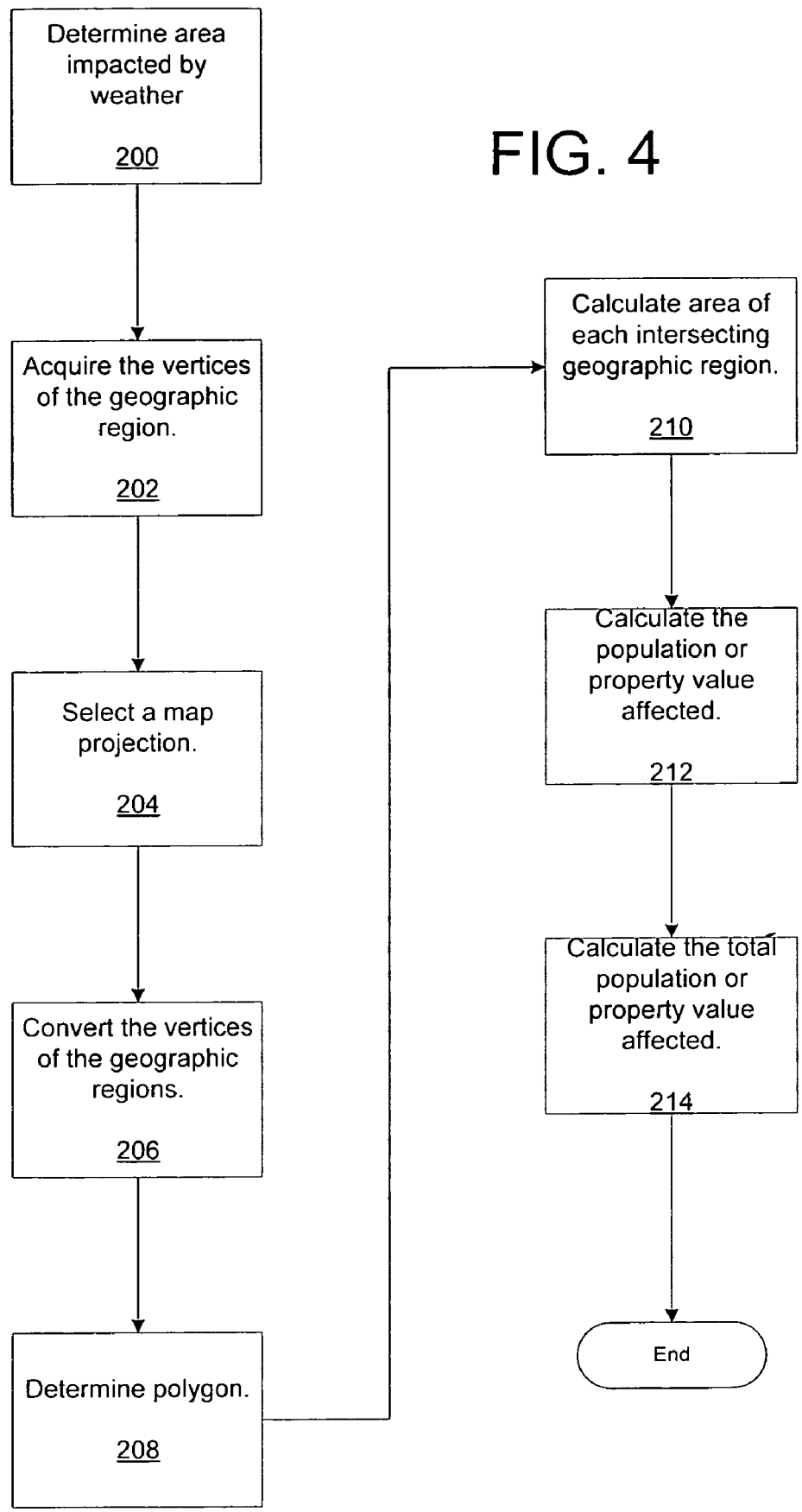
FIG. 4 is an exemplary process for determining the effects of the storm on a population and/or property in the geographic area of FIG. 3.

Referring now to FIG. 4, at step 200, the area that will be impacted by the weather event is described as a polygon on the surface of the earth with the vertices described as latitude, longitude pairs. At step 202, the vertices of geographic regions of data such as population, property values, traffic, transportation, infrastructure, etc. (i.e., "a category of interest") are acquired and expressed in latitude, longitude pairs. At step 204, a map projection is selected that is an approximately equal-area projection, as defined on Page 4 of "Map Projections—A Working Manual, US Geological Survey Professional Paper 1395," by John P. Snyder. For mid-latitude locations (e.g., the continental United States) the Lambert Conformal with standard parallels north and south of the area affected by the weather may be used for such a projection.

At step 206, the vertices of the geographic regions from step 202 and weather-affected polygons from step 200 are converted from latitude, longitude pairs to meters of Easting and Northing. At step 208, a polygon that represents the intersection of each geographic region with the weather-affected region is determined using, e.g., the Weiler-Atherton polygon intersection algorithm. Geographic regions that do not intersect with the weather affected region are discarded. Information regarding the well-known Weiler-Atherton polygon intersection algorithm may be found in ACM SIGGRAPH Computer Graphics, "Hidden surface removal using polygon area sorting," Kevin Weiler, Peter Atherton, Volume 11, Issue 2, Summer 1977, Pages: 214–222, which is incorporated herein by reference in its entirety.

At step 210, for each intersecting geographic region in step 208, the area of the region is calculated, and the area of the intersection of the geographic region and the weather-affected area is calculated using, e.g., a polygon area algorithm. An exemplary polygon area algorithm may be a polygon area calculation based on the 2D version of Green's Theorem, such as that described in "Graphics Gems IV," Paul Heckbert (editor), Academic Press, 1994, which is incorporated herein by reference in its entirety (see, Bashein, Gerard, and Detmer, Paul R., "Centroid of a Polygon," p. 3–6).

At step 212, for each intersecting geographic region in step 208, the population, property value, traffic, infrastructure, etc. affected is calculated by multiplying the total population, property value, traffic, infrastructure, etc. by the ratio of the area of the intersection to the total area of the geographic region. In the exemplary map of FIG. 3, the area potentially affected by the thunderstorm intersects portions of counties A, B, C, and D but counties E, F and G are unlikely to be affected by the storm.

Once the potentially affected counties are identified and the portion of each county potentially affected is calculated, the data for each county (or smaller sections 108–114, if available and affected) is used to calculate the total number of people, property, traffic, infrastructure, etc. threatened by the storm (step 214). This data may be adjusted by the storm path probability (FIGS. 2 and 3). The total people, property, traffic, infrastructure, etc. affected is calculated by taking the sum of the affected people, property, traffic, infrastructure, etc. in each intersecting geographic region.

It may be assumed that the people, property, traffic, infrastructure, etc. of the county is distributed evenly over the county unless more detailed information, such as that in sections 108–114, is available. Furthermore, if there is additional information about the nature of the people, property, traffic, infrastructure, etc. or the vulnerability of the people, property, traffic, infrastructure, etc. to the particular significant weather at hand, additional calculations can be made to estimate information such as number of people who may be injured or killed, the estimated property damage in monetary terms, and/or traffic and infrastructure disruption and damage.

Those skilled in the art will recognize that the aforementioned calculations can be made in other coordinate systems without modifying the scope of the invention or its attendant advantages.

Figure 5:
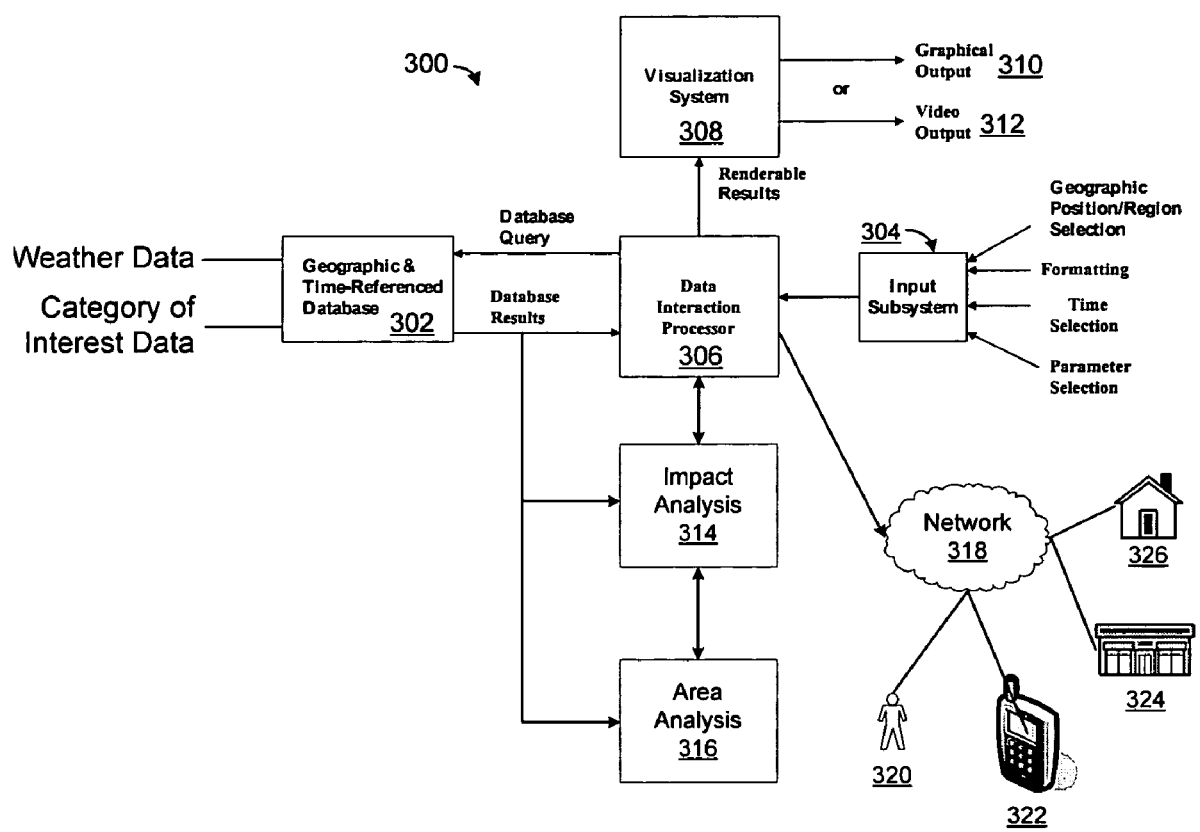
FIG. 5 illustrates an exemplary environment in which the present invention may be embodied.

Referring now to FIG. 5, there is illustrated an overview of the system 300 of the present invention. The geographic and time-referenced database 302 receives and stores real-time data that is geographically registered, such as weather information. The database 302 may also receive population/census data, property value data, traffic data, historical data (e.g., traffic flow, weather, etc.), transportation infrastructure data, etc. As would be understood by one of ordinary skill in the art, the database 302 may receive data regarding any category of interest in accordance with the present invention. The data may also include temporal characteristics, such that it is dynamic over time. Further, the database 302 may contain information regarding city, town, county and state boundaries or locations. The weather data provided to the database 302 may come from several sources (e.g., radar sites, etc.) and is preferably input in real-time. Also, the data may be manually input to the database 302.

The database provides inputs to various components that determine the affected area (area analysis component 316), an impact on the category of interest (impact analysis component 314) and a data interaction processor 306 that provides visualization/presentation outputs. The components 314 and 316, and the processor 306 may be implemented as computer implemented instructions and need not be separate components or separate computer implemented systems within the system 300.

An input subsystem 304 is provided to receive input from a user, such as a geographic position/region selection, formatting inputs, a time selection, and a parameter selection (e.g., weather, warnings, current observations, etc.). The user input may come from a personal computer running the appropriate software to generate inputs that may be received and processed by the system 300 via the data interaction processor 306. For example, this input may come from the user via a mouse, a typed command at a keyboard, from an interactive device such as a computer touch screen, a visual tracking system, etc.

The user inputs may include, but are not limited to, a selection of one or more parameters that are to be extracted from the underlying geographic database 302. The inputs may specify to the processor 306 a specific time or a time range for which the database is to be queried, or a geographic position or region for which the data is to be queried in accordance with the user input. Formatting may be specified that indicates how information is to be displayed. The formatting may include a presentation format (e.g., textual versus iconic), and graphical attributes such as font or line width.

The visualization system 308 for this system 300 can be any computer graphics system capable of generating graphical representations of geographic information such that that representation can be displayed on broadcast television, cable or other transmission media. An example of such a system is WeatherProducer available from WSI Corporation, Andover, Mass. The visualization system 308 is graphical in nature and presents, e.g., a map of a particular geographic area and turns coded information extracted from the database 302 via the data interaction processor 306 into a graphical display. The visualization system 308 includes both video and graphical outputs 310 and 312, which may be used for broadcast television, or to provide a datastream communicated over the Internet or other wide area network for use by visitors to websites (e.g., personal computers running Web Browsers and/or Flash players, etc.).

The system 300 may automatically generate a geographical map display showing a subset of the weather information. Weather information may be overlaid on a geographically accurate map display that may include: elevation shaded terrain data, satellite imagery, Geographic Information Systems (GIS) data (e.g., road, buildings, shopping areas, other points of interest). The information may include: an iconic representation of events where each icon is plotted at the appropriate geographic location, a visualization of a weather event, or live video which may be inset on a map. Prior to airtime, the user has the ability to tailor the graphical representation by prioritizing and/or filtering the types of information to be displayed.

As shown in FIG. 5, the data interaction processor 306 may output information to interested users via a network 318. The interested users may include, but are not limited to, emergency personnel 320, mobile devices 322, small businesses 324 and home users 326. The information may be communicated to the interested users as graphical or textual and may be periodic or on an as-necessary basis.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of determining the affect of a weather event on a category of interest, comprising:
   obtaining weather data;
   obtaining data regarding said category of interest, said data being segmented into geographic regions;
   determining a weather-affected geographical region within a path of said weather event;
   determining intersections of said weather-affected geographic region and said geographic regions, said determining intersections of said weather-affected geographic region and said geographic regions further comprises;
      discarding non-intersecting areas of said weather-affected geographic region and said geographic regions;
      determining an area of each intersection between said weather-affected geographic region and said geographic regions;
   determining a quantity affected by said weather event in accordance with said intersections, said quantity being related to said category of interest, said determining a quantity affected by said weather event in accordance with said intersections further comprises;
      determining a total of said category of interest for a predetermined geographic region;
      multiplying said total by a ratio of each said area within said predetermined geographic region and an area of said predetermined geographic region to obtain a sub-quantity for each said area;
      summing all sub-quantities to determine said quantity; and
   providing a forecast including said quantity affected by said weather event as an indication of said affect of said weather event on said category of interest.

2. The method of claim 1, said weather-affected geographical region being a polygon, and said method further comprising:
   determining vertices of said polygon as latitude, longitude pairs; and
   determining vertices of said geographic areas as latitude, longitude pairs.

3. The method of claim 1, further comprising adjusting said total of said category of interest in accordance with one of a storm path probability and information related to a sub-section of said predetermined geographic region.

4. The method of claim 1, wherein said category of interest comprises one of a population, property values, traffic flow, and infrastructure in said geographic region.

5. The method of claim 1, further comprising selecting a map projection that includes said weather-affected geographic region.

6. A system for determining the affect of a weather event on a category of interest, comprising:
   a database receiving weather data and data regarding said category of interest, said data being segmented into geographic regions;
   a processor for forecasting weather conditions and determining a weather-affected geographic region based on said weather conditions, wherein intersections of said weather-affected geographic region and said predetermined geographic regions are determined to ascertain a quantity related to said category of interest affected by said weather event, wherein said quantity affected by said weather is ascertained by determining an area of each intersection between said weather-affected geographic region and said geographic regions determining a total of said category of interest for a predetermined geographic region, multiplying said total by a ratio of each said area within said predetermined geographic region and an area of said predetermined geographic region to obtain a sub-quantity for each said area, and summing all sub-quantities to determine said quantity; and a visualization system displaying said quantity related to said category of interest affected by said weather event.

7. The system of claim 6, wherein said weather-affected geographical region is described as a polygon, and wherein vertices of said polygon and said geographic areas are latitude, longitude pairs.

8. The system of claim 6, further comprising adjusting said quantity related to said category of interest in accordance with one of a storm path probability and information related to a sub-section of said predetermined geographic region.

9. The system of claim 6, wherein said category of interest comprises one of a population, property values traffic flow and infrastructure in said geographic region.

10. The system of claim 6, wherein a map projection is selected that includes said weather-affected geographic region.

11. A computer-readable medium having computer-executable instructions for instructing a computing device to perform the steps of:

obtaining weather data;

obtaining data regarding a category of interest, said data being segmented into geographic regions;

determining a weather-affected geographical region within a path of said weather event;

determining intersections of said weather-affected geographic region and said predetermined geographic regions, said step of determining intersections further comprising instructions to perform the steps of:

discarding non-intersecting areas of said weather-affected geographic region and said geographic regions;

determining an area of each intersection between said weather-affected geographic region and said geographic regions;

determining a quantity affected by said weather event in accordance with said intersections, said quantity being related to said category of interest, said step of determining a quantity affected by said weather event in accordance with said intersections further comprising instructions to perform the steps of:

determining a total of said category of interest for a predetermined geographic region;

multiplying said total by a ratio of each said area within said predetermined geographic region and an area of said predetermined geographic region to obtain a sub-quantity for each said area; and summing all sub-quantities to determine said quantity; and outputting said quantity related to said category of interest affected by said weather event for one or more of: storage, display, and input.

12. The computer-readable medium of claim 11, said weather-affected geographical region being a polygon, and said computer-readable medium further comprising instructions to perform the steps of:

determining vertices of said polygon as latitude, longitude pairs; and determining vertices of said geographic areas as latitude, longitude pairs.

13. The computer-readable medium of claim 11, further comprising instructions to perform the step of adjusting said quantity related to said category of interest in accordance with one of a storm path probability and information related to a sub-section of said predetermined geographic region.

14. The computer-readable medium of claim 11, wherein said category of interest comprises one of population, property values, traffic flow, and infrastructure in said geographic region.

15. The computer-readable medium of claim 11, further comprising instructions to perform the steps of selecting a map projection that includes said weather-affected geographic region.

16. The method of claim 1, said providing a forecast further comprising:

producing a visualization of said quantity affected by said weather event as an indication of said affect of said weather event on said category of interest.

* * * * *